United States Patent
Wang et al.

(10) Patent No.: US 9,882,266 B2
(45) Date of Patent: Jan. 30, 2018

(54) MOBILE DEVICE HAVING AN INTERIOR MULTIBAND ANTENNA AND A PARTIALLY METAL BACK

(71) Applicant: BLACKBERRY LIMITED, Waterloo (CA)

(72) Inventors: Dong Wang, Waterloo (CA); Shirook M. Ali, Milton (CA)

(73) Assignee: BLACKBERRY LIMITED, Waterloo (CA)

( * ) Notice: Subject to any disclaimer, the term of this patent is extended or adjusted under 35 U.S.C. 154(b) by 253 days.

(21) Appl. No.: 14/486,724

(22) Filed: Sep. 15, 2014

(65) Prior Publication Data

US 2016/0079654 A1    Mar. 17, 2016

(51) Int. Cl.
| | |
|---|---|
| *H01Q 1/24* | (2006.01) |
| *H01Q 9/42* | (2006.01) |
| *H01Q 21/28* | (2006.01) |
| *H01Q 5/371* | (2015.01) |
| *H01Q 5/378* | (2015.01) |
| *H01Q 1/50* | (2006.01) |
| *H04M 1/02* | (2006.01) |

(52) U.S. Cl.
CPC ............ *H01Q 1/243* (2013.01); *H01Q 1/50* (2013.01); *H01Q 5/371* (2015.01); *H01Q 5/378* (2015.01); *H01Q 9/42* (2013.01); *H01Q 21/28* (2013.01); *H04M 1/0202* (2013.01)

(58) Field of Classification Search
CPC   H01Q 1/243; H01Q 1/50; H01Q 9/42; H01Q 5/371; H01Q 5/378; H01Q 21/28
USPC ......................................................... 343/702
See application file for complete search history.

(56) References Cited

U.S. PATENT DOCUMENTS

| | | | | |
|---|---|---|---|---|
| 7,183,983 | B2* | 2/2007 | Ozden ................... | H01Q 1/243 |
| | | | | 343/700 MS |
| 9,203,139 | B2* | 12/2015 | Zhu ........................ | H01Q 1/243 |
| 9,350,069 | B2* | 5/2016 | Pascolini ............... | H01Q 1/243 |
| 9,450,647 | B2* | 9/2016 | Yang .................... | H04B 5/0031 |

(Continued)

OTHER PUBLICATIONS

Ahmad Rashidy Razali et al: "Super slim multiband inverted-F antenna for GSM/DCS/PCS operation", Microwave Conference Proceedings (APMC), 2010 Asia-Pacific, IEEE, Dec. 7, 2010 (Dec. 7, 2010), pp. 227-230, XP031929026, ISBN: 978-1-4244-7590-2, the whole document.

(Continued)

*Primary Examiner* — Dameon E Levi
*Assistant Examiner* — Ab Salam Alkassim, Jr.
(74) *Attorney, Agent, or Firm* — Perry + Currier Inc.

(57) ABSTRACT

A mobile device having an interior multiband antenna and a partially metal back is provided. The device comprises: a back side comprising: a conducting central portion; non-conducting portions comprising respective widths from respective end edges of the back side to the conducting central portion, the conducting central portion separating the non-conducting portions; an interior chassis covered by the back side; antennas located on the interior chassis behind each of the non-conducting portions, each of the antennas comprising at least two respective radiating arms configured to resonate in at least three frequency ranges; one or more antenna feeds connected to each of the antennas; and, a switch configured to select one or more of the antennas for operation.

15 Claims, 14 Drawing Sheets

(56) References Cited

U.S. PATENT DOCUMENTS

| | | | | |
|---|---|---|---|---|
| 9,685,693 | B2* | 6/2017 | Kanj | H01Q 1/243 |
| 2007/0057852 | A1* | 3/2007 | Leizerovich | H01Q 7/00 |
| | | | | 343/702 |
| 2008/0316120 | A1* | 12/2008 | Hirota | H01Q 1/2258 |
| | | | | 343/702 |
| 2009/0153407 | A1* | 6/2009 | Zhang | H01Q 1/243 |
| | | | | 343/702 |
| 2012/0157175 | A1* | 6/2012 | Golko | G06F 1/1698 |
| | | | | 455/575.7 |
| 2013/0069836 | A1* | 3/2013 | Bungo | H01Q 1/243 |
| | | | | 343/724 |
| 2013/0257659 | A1* | 10/2013 | Darnell | H01Q 1/243 |
| | | | | 343/702 |
| 2014/0125528 | A1* | 5/2014 | Tsai | H01Q 1/243 |
| | | | | 343/702 |
| 2015/0138020 | A1* | 5/2015 | Khobragade | H01Q 1/243 |
| | | | | 343/702 |

OTHER PUBLICATIONS

Extended European Search Report dated Feb. 8, 2016 for European Patent Application No. 15184714.2.

* cited by examiner

Antenna Selection Table

| | FS | | | | |
|---|---|---|---|---|---|
| | 698-790 MHz | 790-920 MHz | 920-960 MHz | 1700-2200 MHz | 2300-2700 MHz |
| | | LB | | MB | HB |
| Ant1 (Primary) | -2.0 | -2.9 | -3.9 | -2.0 | -2.0 |
| Ant2 (Secondary) | -4.5 | -3.1 | -1.9 | -3.0 | -2.2 |
| Switch + Cable Loss | 1 | 1 | 1 | 1 | 1 |
| Main Ant Requirement | -5 | -5 | -6 | -3 | -3 |
| Antenna of Choice | Ant1 | Ant1 or Ant2 | Ant1 or 2 | Ant1 | Ant1 or 2 |

| | BHHR | | | | |
|---|---|---|---|---|---|
| | 698-790 MHz | 790-920 MHz | 920-960 MHz | 1700-2200 MHz | 2300-2700 MHz |
| | | LB | | MB | HB |
| Ant1 (Primary) | -12.1 | -12 | -12 | -10 | -6 |
| Ant2 (Secondary) | -11 | -10 | -11 | -8 | -8 |
| Switch + Cable Loss | 1 | 1 | 1 | 1 | 1 |
| Main Ant Requirement | -13 | -12 | -12 | -9 | -9 |
| Antenna of Choice | Ant1 or 2 | Ant2 | Ant2 | Ant2 | Ant1 or 2 |

Fig. 14

MOBILE DEVICE HAVING AN INTERIOR MULTIBAND ANTENNA AND A PARTIALLY METAL BACK

FIELD

The specification relates generally to antennas, and specifically to a mobile device having an interior multiband antenna and a partially metal back.

BACKGROUND

A MIMO (multiple-input and multiple-output) antenna design of a partial metal housing for 4G handset applications generally includes the antenna working at low, mid and high frequencies (e.g. tri-band) and/or multiband, for example, with a low band being in a range of 710-960 MHz, a medium band being in a range of 1710-2100 MHz, and high band being in a range of 2300-2700 MHz. The multi-band design can effectively reduce the number of antennae used in mobile applications. However, MIMO multi-band antenna technology in partial metal housing handsets can be challenging as such multi-band antennas should fit into a partial metal back compact phone with multi-operating frequencies, and good diversity and capacity performance. However, the partial metal back can interfere with the antenna; hence, when the multi-band antennas are put in the partial metal back handset, their performance deteriorates.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 14 depicts an antennas selection table for use in the device of FIG. 1, according to non-limiting implementations.

DETAILED DESCRIPTION

Figure 1:
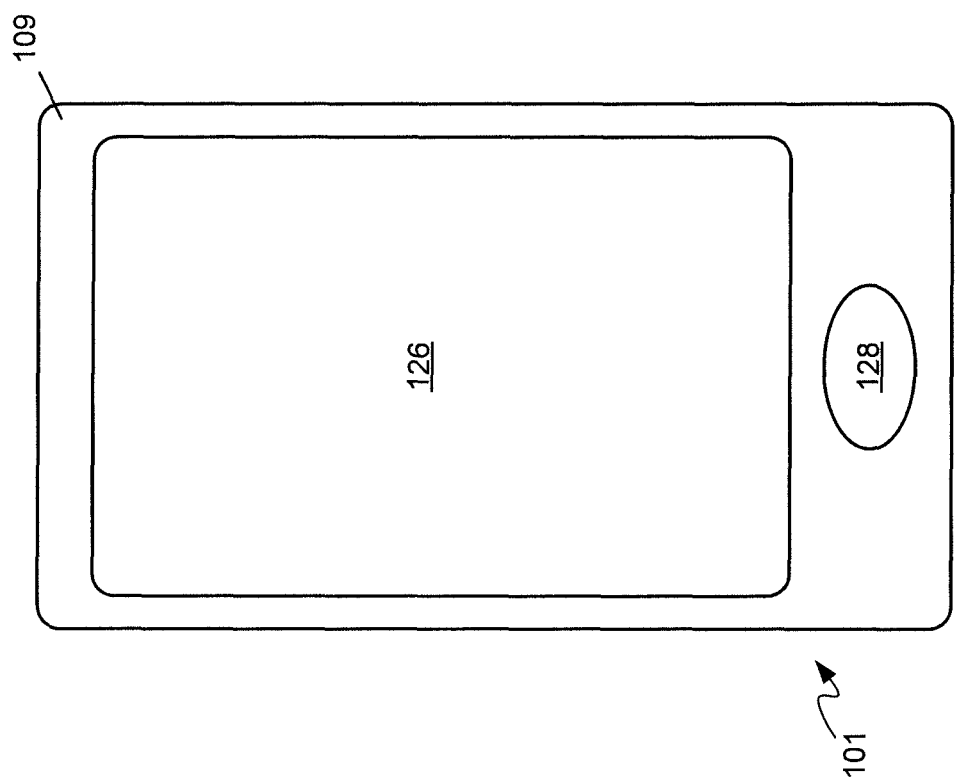
FIG. 1 depicts a front perspective view of a device that includes a multi-antenna system for mobile handsets with at least a partially metallic back side, according to non-limiting implementations.

The present disclosure describes examples of devices with a predominantly metal and/or predominantly conducting back side in the form of a conducting portion of the back side. The back side includes ends that are non-conducting. In such devices, multi-band antennas are located in the interior of the device, for example on an internal chassis, but behind the non-conducting portions of the back side, though connections to an antenna feed and/or a ground plane can run at least partially behind a conducting portion of the back side. For example, the conducting portion can comprise a central portion of the back side that separates non-conducting ends. Radiating arms of each of the antennas are located behind the non-conducting portions. Each multi-band antenna can resonate in three different frequency ranges including, but not limited to, 710-960 MHz, 1710-2100 MHz and 2300-2700 MHz. And a switch in the device can switch between the antennas, and/or cause both antennas to resonate at the same time depending on whether the device is in an uplink mode or a downlink mode, and/or based on an antenna selection table stored in a memory of the device.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

Furthermore, as will become apparent in this specification, certain antenna components may be described as being configured for generating a resonance at a given frequency and/or resonating at a given frequency and/or having a resonance at a given frequency. In general, an antenna component that is configured to resonate at a given frequency, and the like, can also be described as having a resonant length, a radiation length, a radiating length, an electrical length, and the like, corresponding to the given frequency. The electrical length can be similar to, or different from, a physical length of the antenna component. The electrical length of the antenna component can be different from the physical length, for example by using electronic components to effectively lengthen the electrical length as compared to the physical length. The term electrical length is most often used with respect to simple monopole and/or dipole antennas. The resonant length can be similar to, or different from, the electrical length and the physical length of the antenna component. In general, the resonant length corresponds to an effective length of an antenna component used to generate a resonance at the given frequency; for example, for irregularly shaped and/or complex antenna components that resonate at a given frequency, the resonant length can be described as a length of a simple antenna component, including but not limited to a monopole antenna and a dipole antenna, that resonates at the same given frequency.

An aspect of the specification provides a device comprising: a back side comprising: a conducting central portion; a first non-conducting portion comprising a first width from first end edge of the back cover to the conducting central portion; and a second non-conducting portion opposite the first non-conducting portion, comprising a second width from a second end edge of the back cover to the conducting central portion, the conducting central portion separating the first non-conducting portion and the second non-conducting portion; an interior chassis covered by the back side; a first antenna located on the interior chassis behind the first non-conducting portion; a second antenna located on the interior chassis behind the second non-conducting portion, each of the first antenna and the second antenna comprising at least two respective radiating arms configured to resonate in at least three frequency ranges; one or more antenna feeds connected to each of the first antenna and the second antenna; and, a switch configured to select one or more of the first antenna and the second antenna for operation.

The back side can further comprise a non-conducting chassis, and the conducting central portion can comprise a conducting sheet attached to the non-conducting chassis, the first non-conducting portion and the second non-conducting portion can each comprise opposite ends of the non-conducting chassis, and the first end edge and the second end edge can comprise opposite end edges of the non-conducting chassis.

The at least two respective arms of each of the first antenna and the second antenna clear the conducting central portion of the back side.

Each of the first antenna and the second antenna can further comprise: a first respective connection to the one more antenna feeds; and a second respective connection to a ground plane.

Each of the first antenna and the second antenna can further comprise: a first respective connection to the one more antenna feeds; and a second respective connection to a ground plane, each of the first respective connection and the second respective connection can be on opposite sides of a respective antenna radiating structure.

Each of the first antenna and the second antenna can further comprise: a respective connection to the one more antenna feeds, the respective connection can clear the conducting central portion of the back side.

Each of the first antenna and the second antenna can further comprise: a respective connection to a ground plane, the respective connection at least partially located behind the conducting central portion of the back side.

At least a respective portion of one or more of the first antenna and the second antenna can at least partially wrap around a respective end of the interior chassis.

A first radiating arm of the at least two respective radiating arms can be located closer to the conducting central portion than a second radiating arm of the at least two respective radiating arms, and the first radiating arm can be configured to resonate in a lower frequency range than the second radiating arm. The first radiating arm and the second radiating arm can be generally parallel to each other, electrically connected by a connecting portion but otherwise separated by a gap, the first radiating arm electrically connected to a ground plane at a respective end and the second radiating arm electrically connected to the one or more antenna feeds.

The first width and the second width can be different from each other.

The device can further comprise a port through an end of the device adjacent the first antenna, the first antenna clearing the port.

The device can further comprise an interior conducting plane, each of the at least two respective radiating arms at least partially clearing the interior conducting plane.

The device can further comprise a memory storing an antenna selection table, and the switch is configured to select one or more of the first antenna and the second antenna for operation based upon the antenna selection table.

The conducting central portion can cover about 80% of the back side.

A first one of the at least three frequency ranges can comprise one or more of: a frequency range of about 710 MHz to about 960 MHz; an LTE (Long-Term Evolution) frequency range; and LTE700 frequency range; a second one of the at least three frequency ranges can comprise one or more of: about 1710 to about 2100 MHz, a GSM (Global System for Mobile Communications) frequency range; a CDMA (Code Division Multiple Access) frequency range; a PCS (Personal Communications Service) frequency range; and a UMTS (Universal Mobile Telecommunications System) frequency range; and, a third one of the at least three frequency ranges can comprise one or more of: about 2300 to about 2700 MHz, another GSM (Global System for Mobile Communications) frequency range; another CDMA (Code Division Multiple Access) frequency range; another PCS (Personal Communications Service) frequency range; and another UMTS (Universal Mobile Telecommunications System) frequency range.

Figure 2:
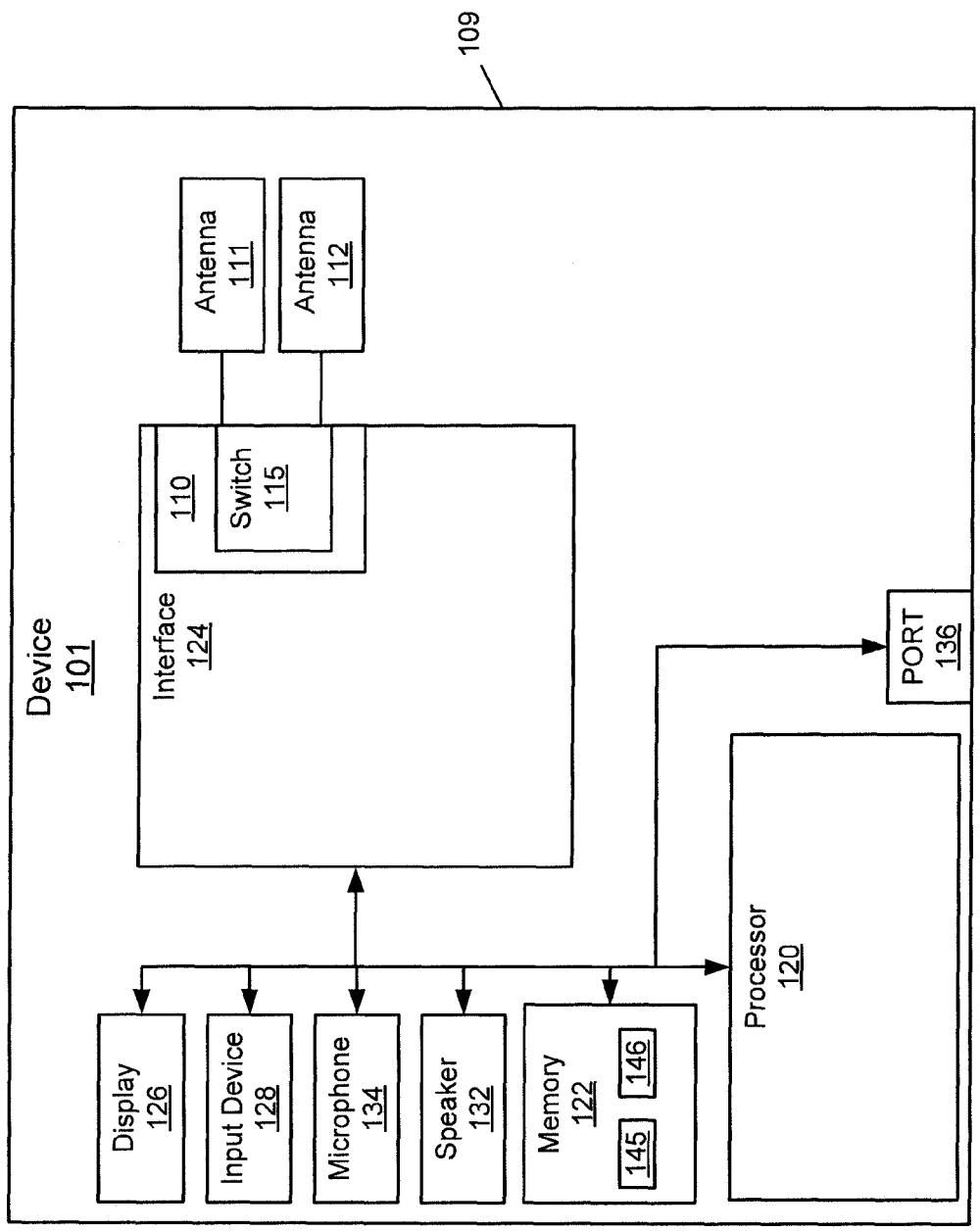
FIG. 2 depicts a schematic diagram of the device of FIG. 1, according to non-limiting implementations.

FIGS. 1 and 2 respectively depict a front perspective view and a schematic diagram of a mobile electronic device 101, referred to interchangeably hereafter as device 101. Device 101 comprises: a chassis 109; one or more antenna feeds 110, a first antenna 111, and a second antenna 112; and a switch 115 configured to select one or more of first antenna 111 and second antenna 112 for operation. Physical configurations of device 101 and antennas 111, 112 will be described in further detail below.

Device 101 can be any type of electronic device that can be used in a self-contained manner to communicate with one or more communication networks using antennas 111, 112. Device 101 can include, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations. Device 101 hence further comprises a processor 120, a memory 122, a display 126, a communication interface 124 that can optionally comprise antenna feed 110 and/or switch 115, at least one input device 128, a speaker 132 and a microphone 134.

It should be emphasized that the shape and structure of device 101 in FIGS. 1 and 2 are purely examples, and contemplate a device that can be used for both wireless voice (e.g. telephony) and wireless data communications (e.g. email, web browsing, text, and the like). However, FIG. 1 contemplates a device that can be used for any suitable specialized functions, including, but not limited to, one or more of, telephony, computing, appliance, and/or entertainment related functions.

With reference to FIG. 1, an exterior of device 101 is depicted with a front portion of chassis 109, the corners of chassis 109 being generally square though, in other implementations, the corners can be rounded and/or any other suitable shape; indeed, the shape and configuration of device 101 depicted in FIG. 1 is merely an example and other shapes and configurations are within the scope of present implementations.

With reference to FIGS. 1 and 2, device 101 comprises at least one input device 128 generally configured to receive input data, and can comprise any suitable combination of input devices, including but not limited to a keyboard, a keypad, a pointing device (as depicted in FIG. 1), a mouse, a track wheel, a trackball, a touchpad, a touch screen and the like. Other suitable input devices are within the scope of present implementations.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

Memory 122 further stores an application 145 that, when processed by processor 120, enables processor 120 to control switch 115 to switch between antennas 111, 112. Furthermore, memory 122 storing application 145 is an example of a computer program product, comprising a non-transitory computer usable medium having a computer readable program code adapted to be executed to implement a method, for example a method stored in application 145.

Memory 122 can further store an antenna selection table 146 that can be processed by processor 120 so that a decision can be made as to which antenna 111, 112 to operate, so that switch 115 can be controlled accordingly. Antenna selection table 146 is described in further detail below.

Processor 120 can be further configured to communicate with display 126, and microphone 134 and speaker 132. Display 126 comprises any suitable one of, or combination of, flat panel displays (e.g. LCD (liquid crystal display), plasma displays, OLED (organic light emitting diode) displays), capacitive or resistive touchscreens, CRTs (cathode ray tubes) and the like. Microphone 134 comprises any suitable microphone for receiving sound and converting to audio data. Speaker 132 comprises any suitable speaker for converting audio data to sound to provide one or more of audible alerts, audible communications from remote communication devices, and the like. In some implementations, input device 128 and display 126 are external to device 101, with processor 120 in communication with each of input device 128 and display 126 via a suitable connection and/or link.

Processor 120 also connects to communication interface 124 (interchangeably referred to as interface 124), which can be implemented as one or more radios and/or connectors and/or network adaptors, configured to wirelessly communicate with one or more communication networks (not depicted) via antennas 111, 112. It will be appreciated that interface 124 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth™links, NFC (near field communication) links, WLAN (wireless local area network) links, WiFi links, WiMax links, packet based links, the Internet, analog networks, the PSTN (public switched telephone network), access points, and the like, and/or a combination.

Specifically, interface 124 comprises radio equipment (i.e. a radio transmitter and/or radio receiver) for receiving and transmitting signals using antennas 111, 112. It is further appreciated that, as depicted, interface 124 comprises antenna feed 110 and switch 115, which alternatively can be separate from interface 124 and/or separate from each other.

As depicted, device 101 further comprises a port 136 which can include, but is not limited to a USB (Universal Serial Bus) port.

While not depicted, device 101 can further comprise a ground plane that can be connected to one or more of antennas 111, 112.

While also not depicted, device 101 further comprises a power source, not depicted, for example a battery or the like. In some implementations the power source can comprise a connection to a mains power supply and a power adaptor (e.g. an AC-to-DC (alternating current to direct current) adaptor).

In any event, it should be understood that a wide variety of configurations for device 101 are contemplated.

Furthermore, each of antennas 111, 112 can be configured to resonate in at least three frequency bands. A first one of the at least three frequency ranges can comprise one or more of: a frequency range of about 710 MHz to about 960 MHz; an LTE (Long-Term Evolution) frequency range; and LTE700 frequency range. A second one of the at least three frequency ranges can comprise one or more of: about 1710 to about 2100 MHz, a GSM (Global System for Mobile Communications) frequency range; a CDMA (Code Division Multiple Access) frequency range; a PCS (Personal Communications Service) frequency range; and a UMTS (Universal Mobile Telecommunications System) frequency range. A third one of the at least three frequency ranges comprises one or more of: about 2300 to about 2700 MHz; another GSM (Global System for Mobile Communications) frequency range; another CDMA (Code Division Multiple Access) frequency range; another PCS (Personal Communications Service) frequency range; and another UMTS (Universal Mobile Telecommunications System) frequency range.

In other words, each antenna 111, 112 can comprises a MIMO (multiple-in-multiple-out) multi-band antenna.

Physical configurations of device 101, antennas 111, 112 are next described in detail with references to FIGS. 3 through 8.

Figure 3:
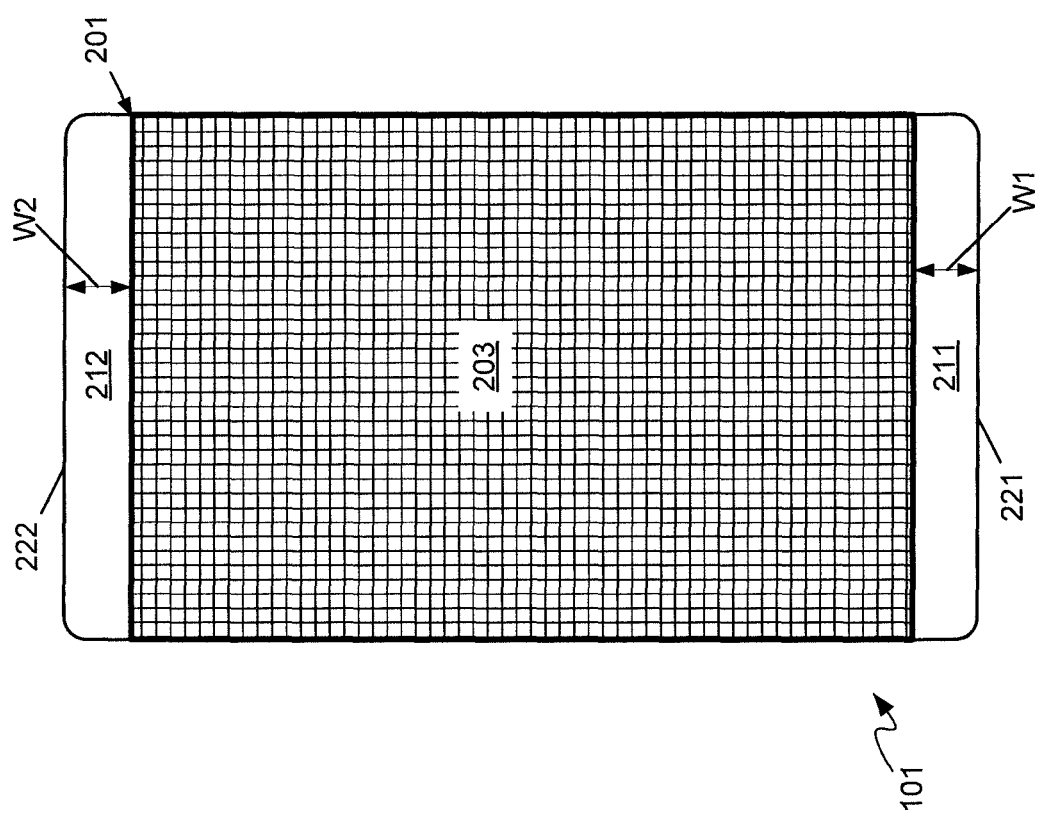
FIG. 3 depicts an exterior perspective view of a back side of the device of FIG. 1, according to non-limiting implementations.

Attention is next directed to FIG. 3 which depicts a perspective view of a back of device 101 that includes a back side 201 of device 101. Back side 201 can comprise a component of chassis 109, and is generally attachable to a remaining portion of device 101, including, but not limited to, a front portion of chassis 109 depicted in FIG. 1 and/or an internal chassis. For example, back side 201 can include a back cover that can be removabley attached to device 101 so that a battery of device 101 can be accessed.

In any event, back side 201 comprises a conducting central portion 203; a first non-conducting portion 211 comprising a first width W1 from first end edge 221 of back side 201 to conducting central portion 203; and a second non-conducting portion 212 opposite first non-conducting portion 211, comprising a second width W2 from a second end edge 222 of back side 201 to conducting central portion 203, conducting central portion 203 separating first non-conducting portion 211 and second non-conducting portion 212. Conducting central portion 203 can comprise one or more conducting materials, including, but not limited to, one or more metals. However, conducting plastics, conducting polymers, and the like are within the scope of present implementations. Non-conducting portions 211, 211 can comprise one or more of plastic, polymer and/or any other suitable non-conducting material.

In some implementations, first width W1 and second width W2 can be different from each other, while in other implementations, first width W1 and second width W2 can be about the same.

In some implementations back side 201 can be flexible so that one or more latches, hooks, and the like of back side 201 can be undone to remove back side 201 from device 101.

In some implementations, back side 201 can further comprise a non-conducting chassis, conducting central portion 203 comprising a conducting sheet attached to the non-conducting chassis, first non-conducting portion 211 and second non-conducting portion 212 each comprising opposite ends of the non-conducting chassis, and first end edge 221 and 222 second end edge each comprising opposite end edges of the non-conducting chassis. However, other structures of back side 201 are within the scope of present implementations; for example, each non-conducting portion 211, 212 can comprise non-conducting caps connected to conducting central portion 203 using any combination of attachment devices, glues, and the like.

In some implementations, as depicted, conducting central portion 203 covers about 80% of back side 201. However, in other implementations, conducting central portion 203 can cover more or less than 80% of back side 201. However, each non-conducting portion 211, 212 is of a size that enables each of antennas 111, 112 to resonate within a specification in the operating frequency ranges; in other words, a size of conducting central portion 203 can be selected so as to not interfere with operation of each of antennas 111, 112.

Figure 4:
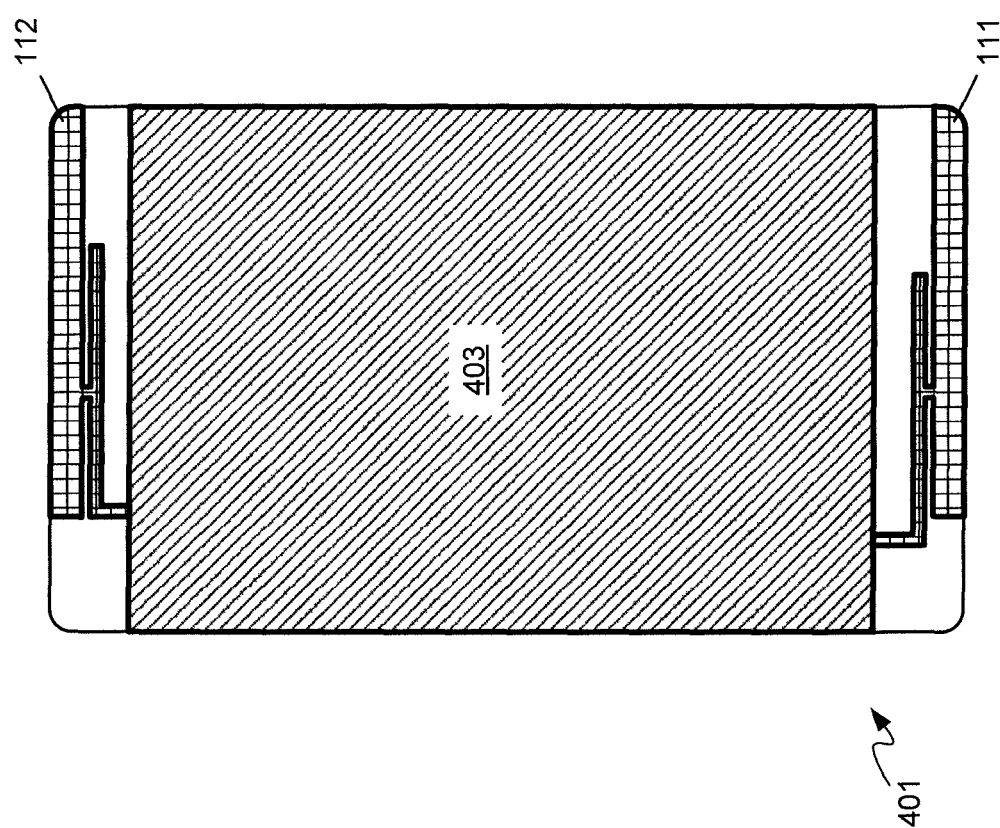
FIG. 4 depicts a perspective view of a back facing side of an interior chassis of the device of FIG. 1, including two multi-band antennas, according to non-limiting implementations.

Attention is next directed to FIG. 4 which depicts an interior chassis 401 of device 101. In general, interior chassis 401 is internal to device 101 and is covered by back side 201. Interior chassis 401 can comprise a non-conducting material including, but not limited to, plastics, polymers and the like. Furthermore, interior chassis 401 can act as a substrate for other internal components of device including, but not limited to processor 120, memory 122, antenna feed 110, interface 124, switch 115 and the like, as well as one or more PCBs (printed circuit boards), computer buses, and the like. Such components can be located in an area 403, for example behind conducting central portion 203 of back side 201.

While interior chassis 401 is depicted as continuous, in other implementations, interior chassis 401 can comprise apertures, cut-outs and the like to accommodate other components of device 101.

Figure 5:
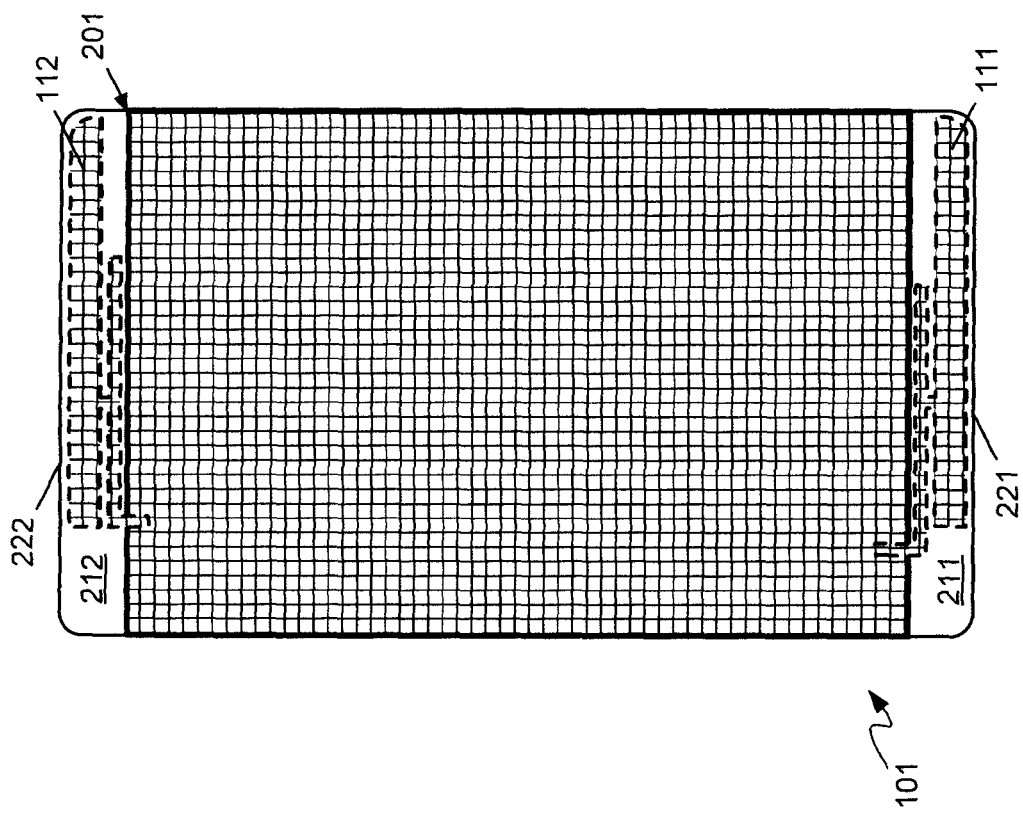
FIG. 5 depicts an exterior perspective view of the back side of the device of FIG. 1, along with the relative location of the antennas located on the interior chassis, according to non-limiting implementations.

First antenna 111 is generally located on interior chassis 401 behind first non-conducting portion 211 (as depicted in FIG. 5, described in further detail below). Similarly, second antenna 112 is generally located on interior chassis 401 behind second non-conducting portion 212. Further, as described in further detail below, each of first antenna 111 and second antenna 112 comprises at least two respective radiating arms configured to resonate in at least three frequency ranges. Furthermore, one or more antenna feeds 110 are connected to each of first antenna 111 and second antenna 112. In addition, switch 115 is configured to select one or more of first antenna 111 and second antenna 112 for operation.

Attention is next directed to FIG. 5, which is substantially similar to FIG. 3, with like elements having like numbers. However, in FIG. 5, positions of antennas 111, 112 on the interior of device 101 are depicted in outline to show that first antenna 111 is located behind the first non-conducting portion 211 and second antenna 112 is located behind the second non-conducting portion 212.

In particular, a position of the at least two respective arms of each of first antenna 111 and second antenna 112 are selected to clear conducting central portion 203 of back side 201. In other words, a position of each of antennas 111, 112 behind non-conducting portions 211, 212 are selected to minimize interference with conducting central portion 203. Hence, the at least two respective arms of each of first antenna 111 and second antenna 112 do not overlap with conducting central portion 203 (where "clear" is generally understood to mean substantially non-overlapping).

Figure 6:
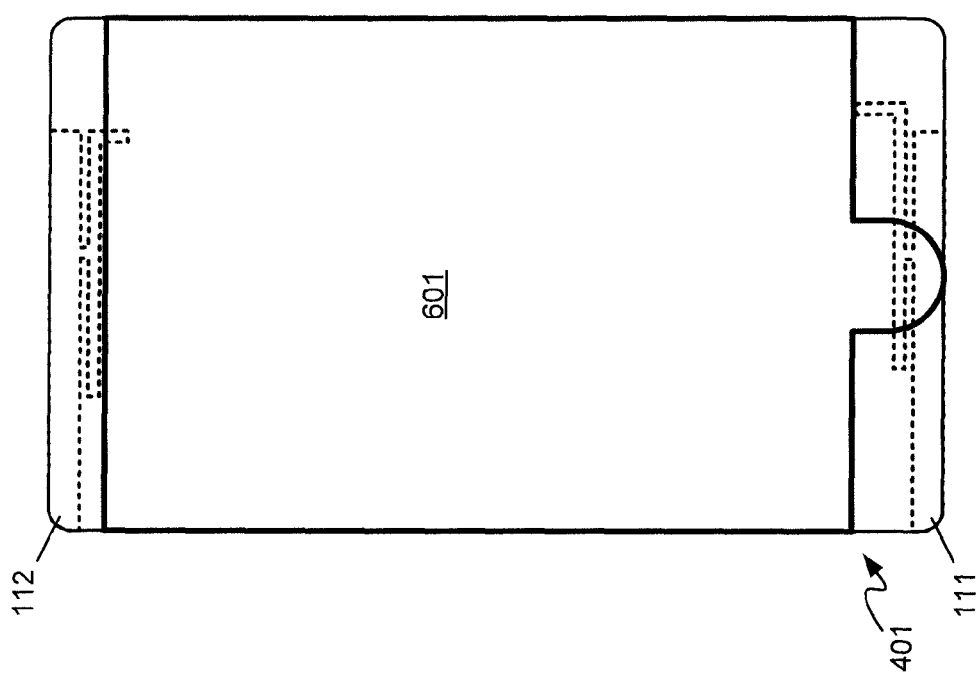
FIG. 6 depicts a perspective view of a front facing side of an interior chassis of the device of FIG. 1, along with the relative location of the antennas located on the back facing side of the interior chassis, according to non-limiting implementations.

Attention is next directed to FIG. 6 which depicts a side of interior chassis 401 that is opposite the side depicted in FIG. 4. In other words, the side of interior chassis 401 depicted in FIG. 4 faces a back of device 101, while the side of interior chassis 401 depicted in FIG. 6 faces a front of device 101 (e.g. as depicted in FIG. 1). In these implementations, device 101 further comprises an interior conducting plane 601, for example each of the at least two respective radiating arms of each of antennas 111, 112 at least partially clearing the interior conducting plane 601. As depicted, interior conducting plane 601 is located on a side of interior chassis 401 opposite antennas 111, 112. Interior conducting plane comprises one or more of a metal, a conducting plastic, a conducting polymer and the like. In some implementations, interior conducting plane can comprise a ground plane of device 101, with one or more antenna feeds 110 connected thereto. In any event, radiating arms of antenna 112 generally clear (i.e. do not overlap) interior conducting plane 601. However, a portion of interior conducting plane 601 can extend towards an end of device 101, for example an end adjacent first antenna 111. Such an extension can be associated with a port of device 101, including, but not limited to, a USB (Universal Serial Bus) port. In these implementations, the portion of interior conducting plane 601 that extends towards the end of device 101 and/or along a port (e.g. port 136), can partially overlap radiating arms of antenna 111, which can affect the performance of antenna 111, as described in further detail below.

While interior conducting plane 601 is depicted as continuous, in other implementations, interior conducting plane 601 can comprise apertures, cut-outs and the like to accommodate other components of device 101.

Figure 7:
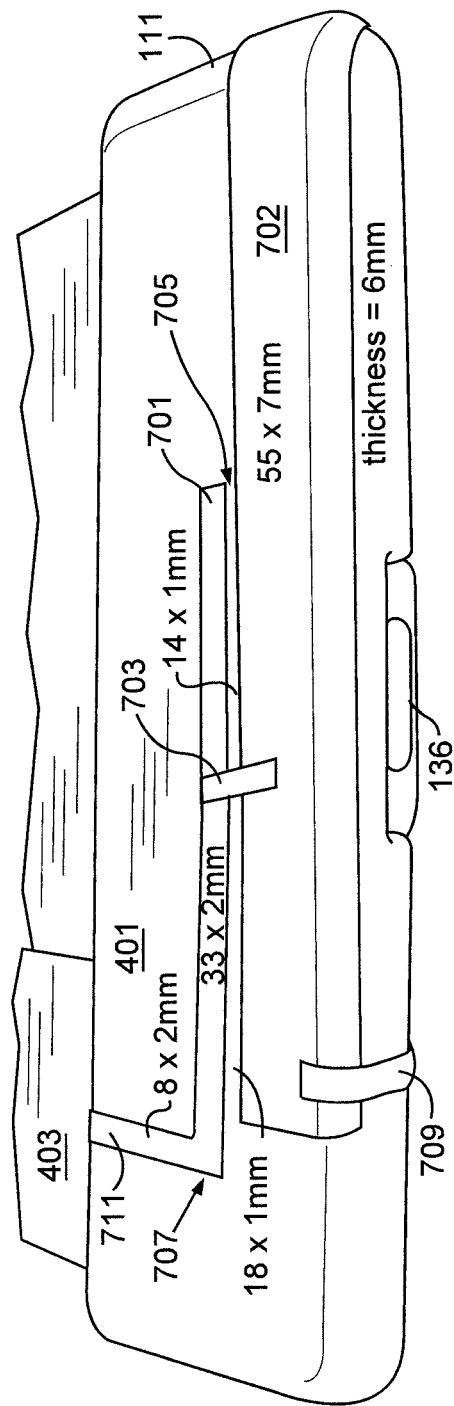
FIG. 7 depicts a perspective view of an end of the interior chassis comprising a first antenna of the device of FIG. 1, according to non-limiting implementations.

Attention is next directed to FIG. 7, which depicts an end view of interior chassis 401 showing antenna 111 in detail, as well as dimensions of a successful prototype of antenna 111. In these implementations, interior chassis 401 comprises a plastic substrate with a thickness of about 6mm at an end of interior chassis 401 upon which antenna 111 is mounted. For example, antenna 111 can comprise a microstrip on interior chassis 401. As depicted interior chassis 401 further comprises port 136 through an end adjacent first antenna 111, first antenna 111 clearing port 136.

In any event, as seen in FIG. 7, first antenna 111 comprises a first radiating arm 701 and a second radiating arm 702. First radiating arm 701 of the at least two respective radiating arms of first antenna 111 is located closer to conducting central portion 203 than second radiating arm 702 of the at least two respective radiating arms, first radiating arm 701 configured to resonate in a lower frequency range than second radiating arm 702. In other words, first radiating arm 701 is the requirement value, shorter than second radiating arm 702.

Furthermore, first radiating arm 701 and second radiating arm 702 are generally parallel to each other, and electrically connected by a connecting portion 703 but otherwise separated by a gap 705, first radiating arm 701 electrically connected to a ground plane (not depicted) at a respective end 707 and second radiating arm 702 electrically connected to one or more antenna feeds 110 (not depicted in FIG. 7) via a connection 709 which, as depicted, wraps around an end of interior chassis 401.

Hence, as depicted antenna 111 comprises a first respective connection 709 to one or more antenna feeds 110; and a second respective connection 711 to a ground plane.

Furthermore, connection 709 to one more antenna feed 110 clears conducting central portion 203 of back side 201 (i.e. connection 709 does not overlap conducting central portion 203).

In addition, connection 711 to the ground plane can at least partially be located behind conducting central portion 203 of back side 201. In other words, connection 711 can connect end 707 of first radiating arm 701, which clears conducting central portion 203 to the ground plane which can be located behind conducting central portion 203. Indeed, in some implementations, conducting central portion 203 can comprise the ground plane.

Furthermore, while antenna 111 comprises a PIFA (Planar Inverted F Antenna) other antenna shapes are within the scope of present implementations that will resonate in similar frequency ranges. In addition, first respective connection 709 to one more antenna feeds 110 and second respective connection 711 to a ground plane, are appreciated to be located on opposite sides of a respective antenna radiating structure of antenna 111. In other words, connections 709, 711 are on opposite sides of an antenna radiating structure formed by radiating arms 701, 702.

From FIG. 7, it is further seen that second radiating arm 702 is located along an edge of interior chassis 401 and at least partially wraps around one or more sides of interior chassis 401, while clearing and/or not overlapping port 136. Indeed, second radiating arm 702 can conform to a geometry of an adjacent end of interior chassis 401.

As depicted, in a successful prototype, first radiating arm 701 has dimensions of about 33 mm long by about 2 mm wide, second radiating arm has dimensions of about 55 mm long by about 7 mm wide, and gap 705 comprises two portions separated by connection 703, a first portion of gap 705 having dimensions of about 18 mm long by about 1 mm wide, and a second portion having dimensions of about 14 mm long by about 1 mm wide. Furthermore, connection 711 has dimensions of about 8 mm long by about 2 mm wide. However, other dimensions and configurations that allow antenna 111 to resonate within at least three frequency ranges are within the scope of present implementations.

Figure 8:
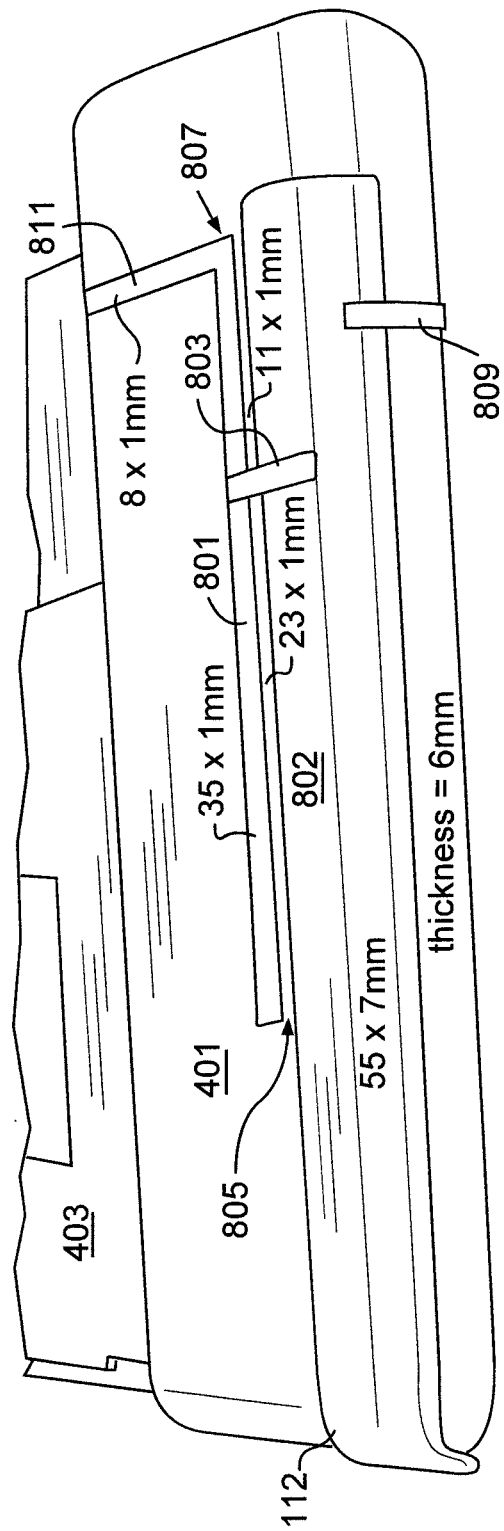
FIG. 8 depicts a perspective view of another end of the interior chassis comprising a second antenna of the device of FIG. 1, according to non-limiting implementations.

Attention is next directed to FIG. 8, which depicts an end view of interior chassis 401 showing antenna 112 in detail, as well as dimensions of a successful prototype of antenna 112. In these implementations, interior chassis 401 comprises a plastic substrate with a thickness of about 6mm at an end of interior chassis 401 upon which antenna 112 is mounted. For example, antenna 112 can comprise a microstrip on interior chassis 401. In other words, FIG. 8 depicts an opposite end of interior chassis 401 as that depicted in FIG. 7.

In any event, as seen in FIG. 8, second antenna 112 comprises a first radiating arm 801 and a second radiating arm 802. First radiating arm 801 of the at least two respective radiating arms of second antenna 112 is located closer to conducting central portion 203 than second radiating arm 802 of the at least two respective radiating arms, first radiating arm 801 configured to resonate in a lower frequency range than second radiating arm 802. In other words, first radiating arm 801 is shorter than second radiating arm 802.

Furthermore, first radiating arm 801 and second radiating arm 802 are generally parallel to each other, and electrically connected by a connecting portion 803 but otherwise separated by a gap 805, first radiating arm 801 electrically connected to a ground plane (not depicted) at a respective end 807 and second radiating arm 802 electrically connected to one or more antenna feeds 110 (not depicted in FIG. 8) via a connection 809 which, as depicted, wraps around an end of interior chassis 401.

Hence, as depicted antenna 112 comprises a first respective connection 809 to one or more antenna feeds 110; and a second respective connection 811 to a ground plane.

Furthermore, connection 809 to one more antenna feeds 110 clears conducting central portion 203 of back side 201 (i.e. connection 809 does not overlap conducting central portion 203).

In addition, connection 811 to the ground plane can at least partially be located behind conducting central portion 203 of back side 201. In other words, connection 811 can connect end 807 of first radiating arm 801, which clears conducting central portion 203 to the ground plane which can be located behind conducting central portion 203. Indeed, in some implementations, conducting central portion 203 can comprise the ground plane.

Furthermore, while antenna 112 comprises a PIFA (Planar Inverted F Antenna) other antenna shapes are within the scope of present implementations that will resonate in similar frequency ranges. In addition, first respective connection 809 to one more antenna feeds 110 and second respective connection 811 to a ground plane, are appreciated to be located on opposite sides of a respective antenna radiating structure of antenna 112. In other words, connections 809, 811 are on opposite sides of an antenna radiating structure formed by radiating arms 801, 802.

From FIG. 8, it is further seen that second radiating arm 802 is located along an edge of interior chassis 401 and at least partially wraps around one or more sides of interior chassis 401, while clearing and/or not overlapping port 136. Indeed, second radiating arm 802 can conform to a geometry of an adjacent end of interior chassis 401.

As depicted, in a successful prototype of device 101, first radiating arm 801 has dimensions of about 35 mm long by about 1 mm wide, second radiating arm has dimensions of about 55 mm long by about 7 mm wide, and gap 805 comprises two portions separated by connection 803, a first portion of gap 805 having dimensions of about 11 mm long by about 1 mm wide, and a second portion having dimensions of about 23 mm long by about 1 mm wide. Furthermore, connection 811 has dimensions of about 8 mm long by about 1 mm wide. However, other dimensions and configurations that allow antenna 112 to resonate within at least three frequency ranges are within the scope of present implementations.

While each of antennas 111, 112 comprise two respective radiating arms, each of antennas 111, 112 are configured to resonate in three frequency ranges, a lower frequency range associated with the longer of the two radiating arms, a higher frequency range associated with the longer of the two radiating arms, and a mid-frequency range associated with a combination of the two radiating arms. In other words, each antenna 111, 112 comprises three different electrical lengths. Furthermore, the difference in dimensions between antennas 111, 112 described with reference to FIGS. 7 and 8 can be due to differences in local electrical environment. For example, first antenna 111 is adjacent port 136 and further has partial overlap with interior conducting plane 601; hence dimensions of first antenna 111 are different from dimensions of second antenna 112 to account for the effect of port 136 and/or interior conducting plane 601 on first antenna 111.

Further, while there can be one or more antenna feeds 110, each antenna 111, 112 has one respective connection 709, 809 to an antenna feed 110. Hence, each antenna 111, 112 can also be referred to as a single-feed multiband antenna.

Figure 9:
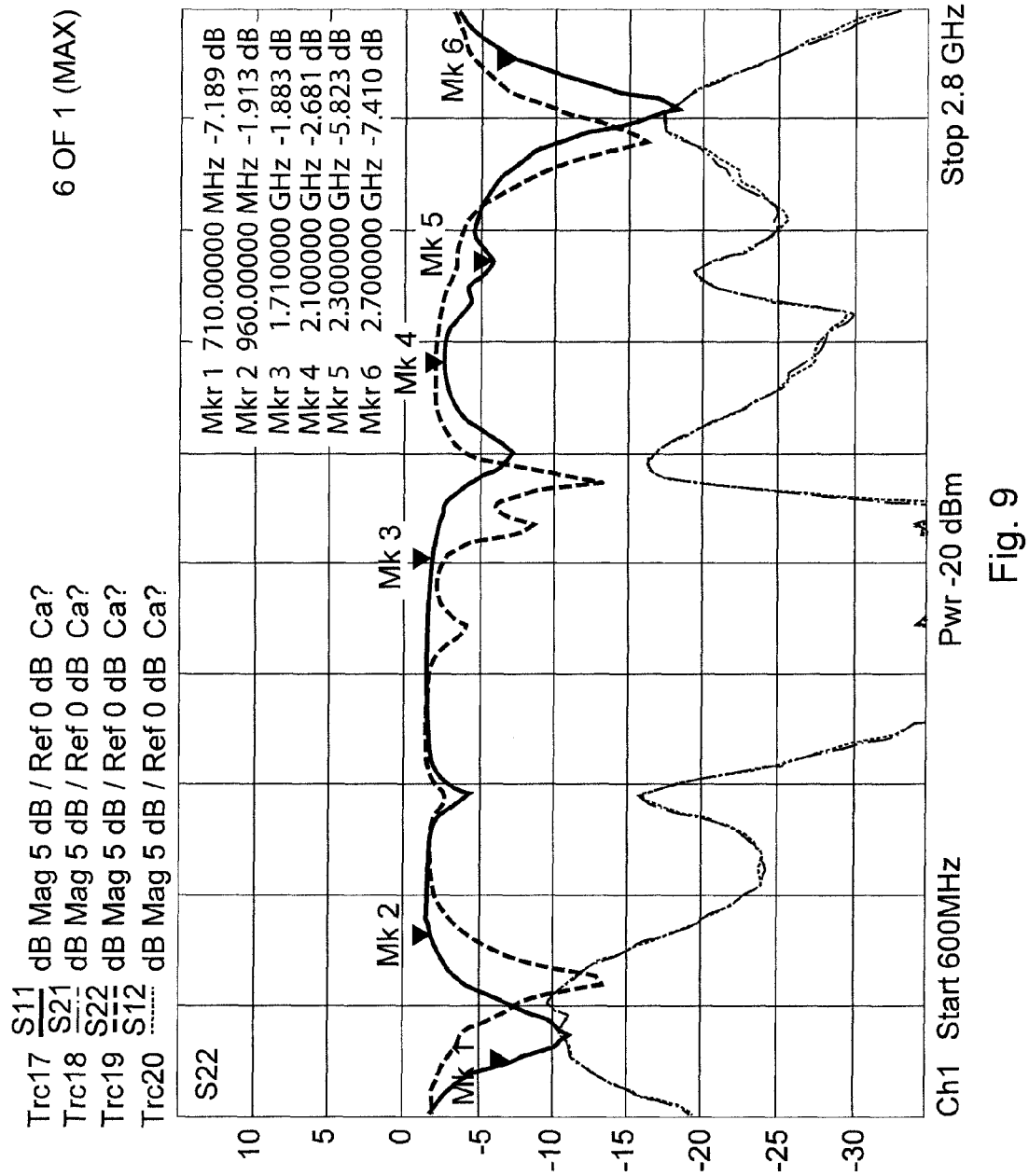
FIG. 9 depicts return-loss curves of antennas of a successful prototype of the device of FIG. 1, according to non-limiting implementations.

Attention is next directed to FIG. 9 which depicts return-loss curves for specific non-limiting implementations of the successful prototype of antennas 111, 112 showing return-loss on the y-axis from −35 db to 15 db, and frequency on the x-axis from 600 MHz to 2800 MHz (i.e. 2.8 GHz), for each of S11, S21, S22 and S12 radiation components. From these curves it is apparent that antennas 111, 112 resonate in frequency ranges of 710-960 MHz, 1710-2100 MHz and 2300-2700 MHz, as peaks in each of these bands are present in FIG. 9. Indeed, the various markers shown in FIG. 9 show the return-loss for the S11 component at frequencies of 710 MHz, 960 MHz, 1710 MHz, 2100 MHz, 2300 MHz and 2700 MHz, and peaks are clearly located between marker pairs of 710 MHz to 960 MHz, 1710 MHz to 2100 MHz, and 2300 MHz to 2700 MHz, which delineate cellular frequency ranges.

In the successful prototype width W1 was about 10 mm, and width W2 was about 9 mm. Furthermore, clearance of the interior conducting plane 601 was about 14 mm for antenna 111 and about 12 mm for antenna 112 (i.e. there was about 14 mm and 12 mm of non-conducting material on either side of interior conducting plane 601, not including the extension for port 136, upon which antennas 111, 112 were located).

Figure 10:
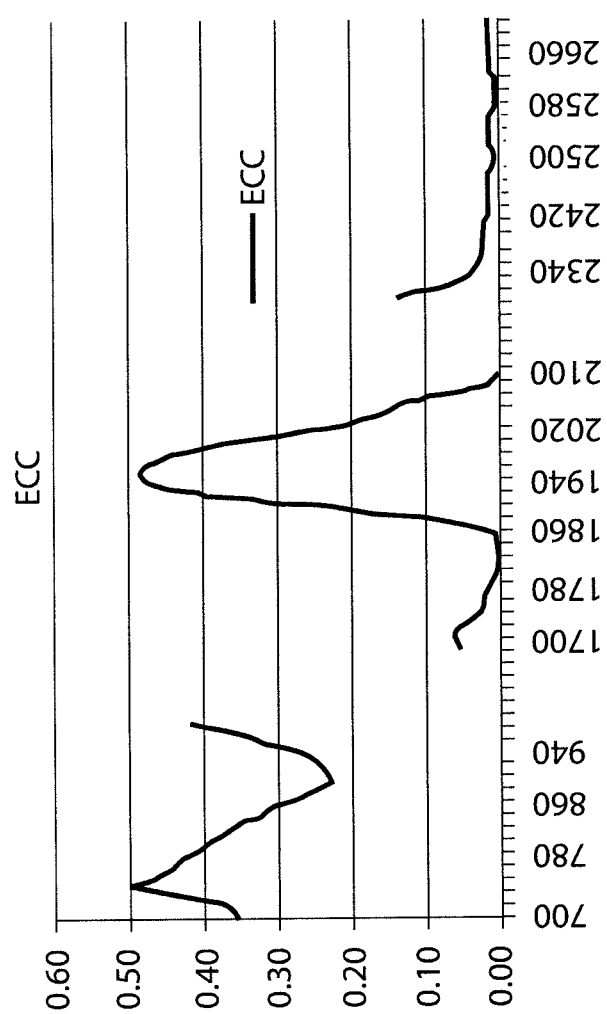
FIG. 10 depicts envelope correlation coefficients as a function of frequency of the successful prototype, according to non-limiting implementations.
Figure 11:
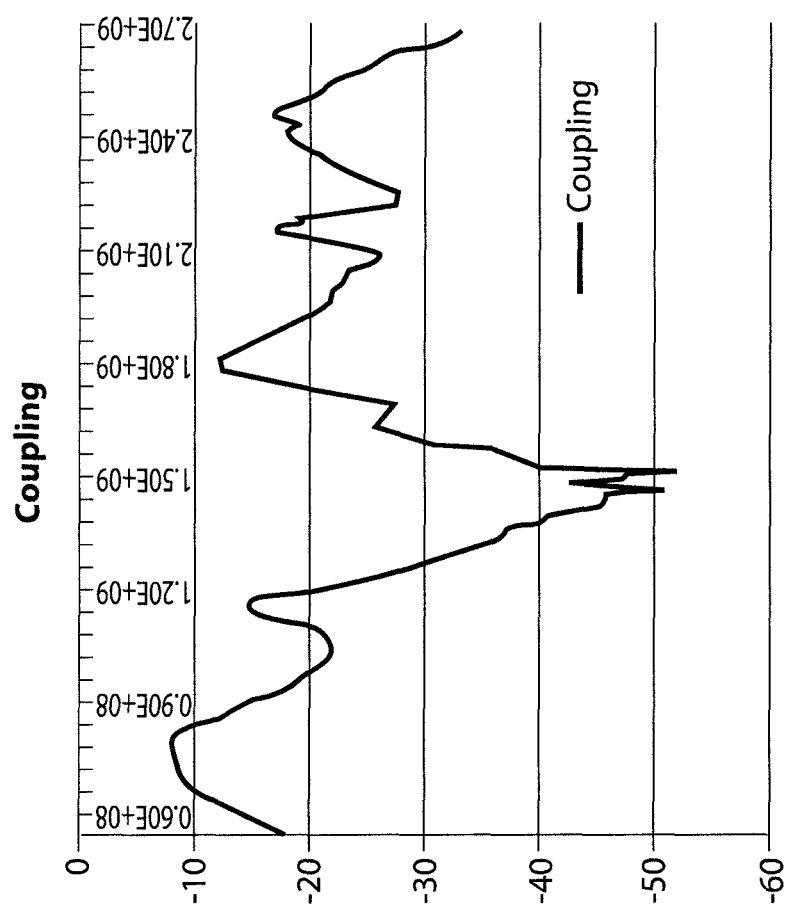
FIG. 11 depicts a coupling curve of the successful prototype, according to non-limiting implementations.

Attention is next directed to FIGS. 10 and 11, which respectively depicts an envelope correlation coefficient as a function of frequency and coupling as a function of frequency between antennas 111, 112 in the successful prototype. In general, as can be seen in FIG. 10, the envelope correlation coefficient is less than about 0.5 in each of the frequency ranges of 710-960 MHz, 1710-2100 MHz and 2300-2700 MHz. Envelope correlation coefficients of less than 0.5 are appreciated to be associated with independent sub channels into each antenna 111, 112 on a downlink. Furthermore, as can be seen in FIG. 11, coupling between antennas 111, 112 is also "good" in each of the frequency ranges of 710-960 MHz, 1710-2100 MHz and 2300-2700 MHz. Furthermore, "good" coupling between antennas 111, 112 indicates isolation of antennas 111, 112 from each other such that a signal from one antenna 111, 112 does not leak from one antenna path into an antenna path of the other of the antennas 111, 112. Hence, the successful prototype has good performance in cellular frequency ranges.

Figure 12:
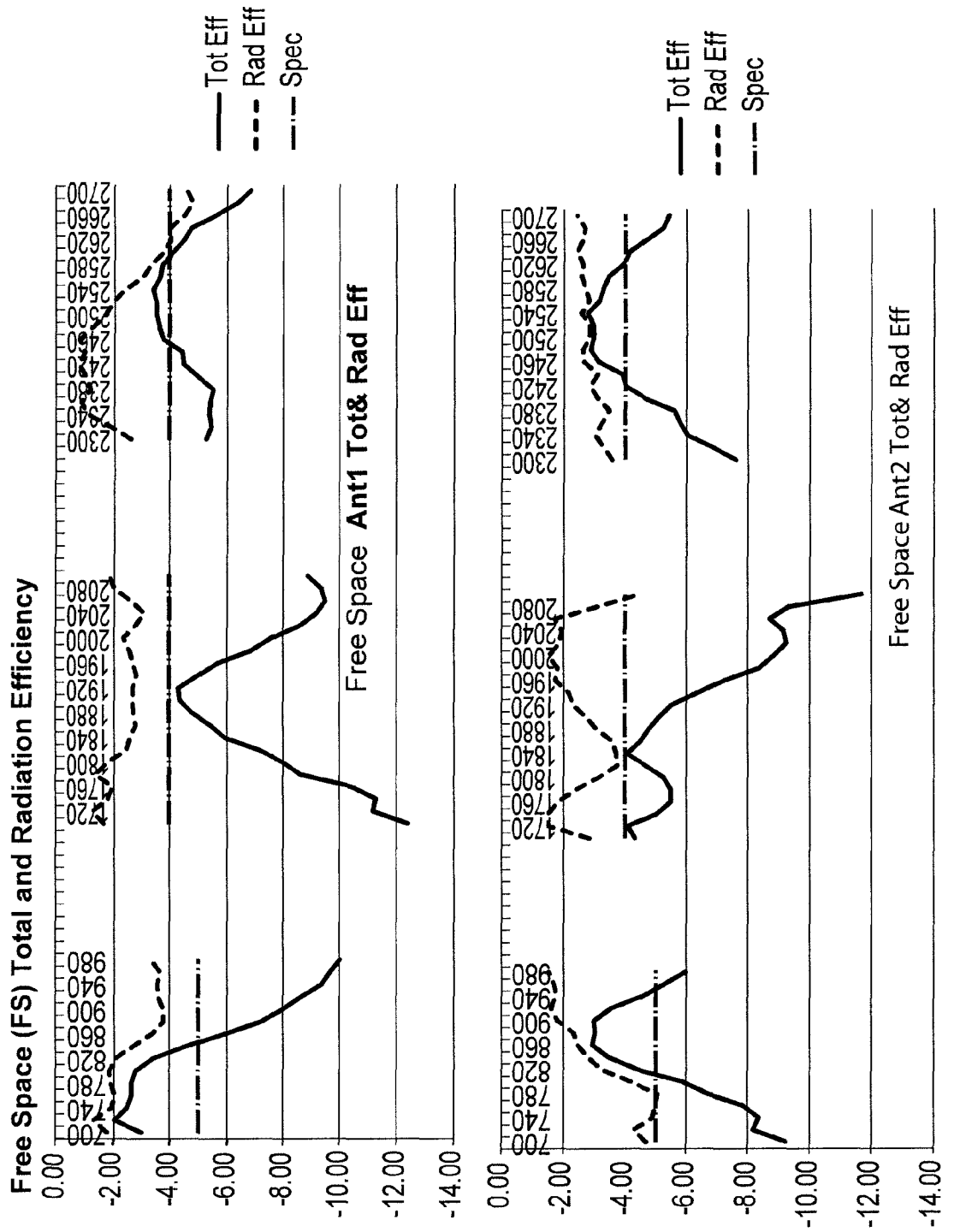
FIG. 12 depicts free space total and radiation efficiencies of the antennas of the successful prototype, according to non-limiting implementations.

Such good performance of the successful prototype is further shown in FIG. 12 which depicts free space efficiency as a function of frequency for each of antenna 111 ("Ant1" in FIG. 12, the top set of curves) and antenna 112 ("Ant2" in FIG. 12, the bottom set of curves), and specifically free space total efficiency (solid lines) and free space radiation efficiency (broken lines) as a function of frequency for each of antenna 111 and antenna 112, in each of the frequency ranges of 710-960 MHz, 1710-2100 MHz and 2300-2700 MHz. The target free space radiation efficiency values for given specifications (including, but not limited to specifications provided by an operator, specifications for a given network, a design specification for a given band, and the like) in each of the frequency ranges are depicted as straight lines. In other words, in the frequency range of 710-960 MHz, the target free space radiation efficiency is greater than about −4.50 db, in the frequency range of 1710-2100 MHz the target free space radiation efficiency is greater than about −4.00 db, and in the frequency range of 2300-2700 MHz the target free space radiation efficiency is greater than about −4.00 db. It is clear that the free space radiation efficiency meets the target specifications in all but the highest frequency range of antenna 111 (i.e. the free space radiation curves are higher than the target value in all but the highest frequency range of antenna 111). In general, total efficiency is the radiation efficiency plus losses for mismatch. Hence, in some implementations, one or more antenna feeds 110 and/or interface 124 can comprise one or more of a matching circuit and/or a tuning circuit to account for such mismatches.

Figure 13:
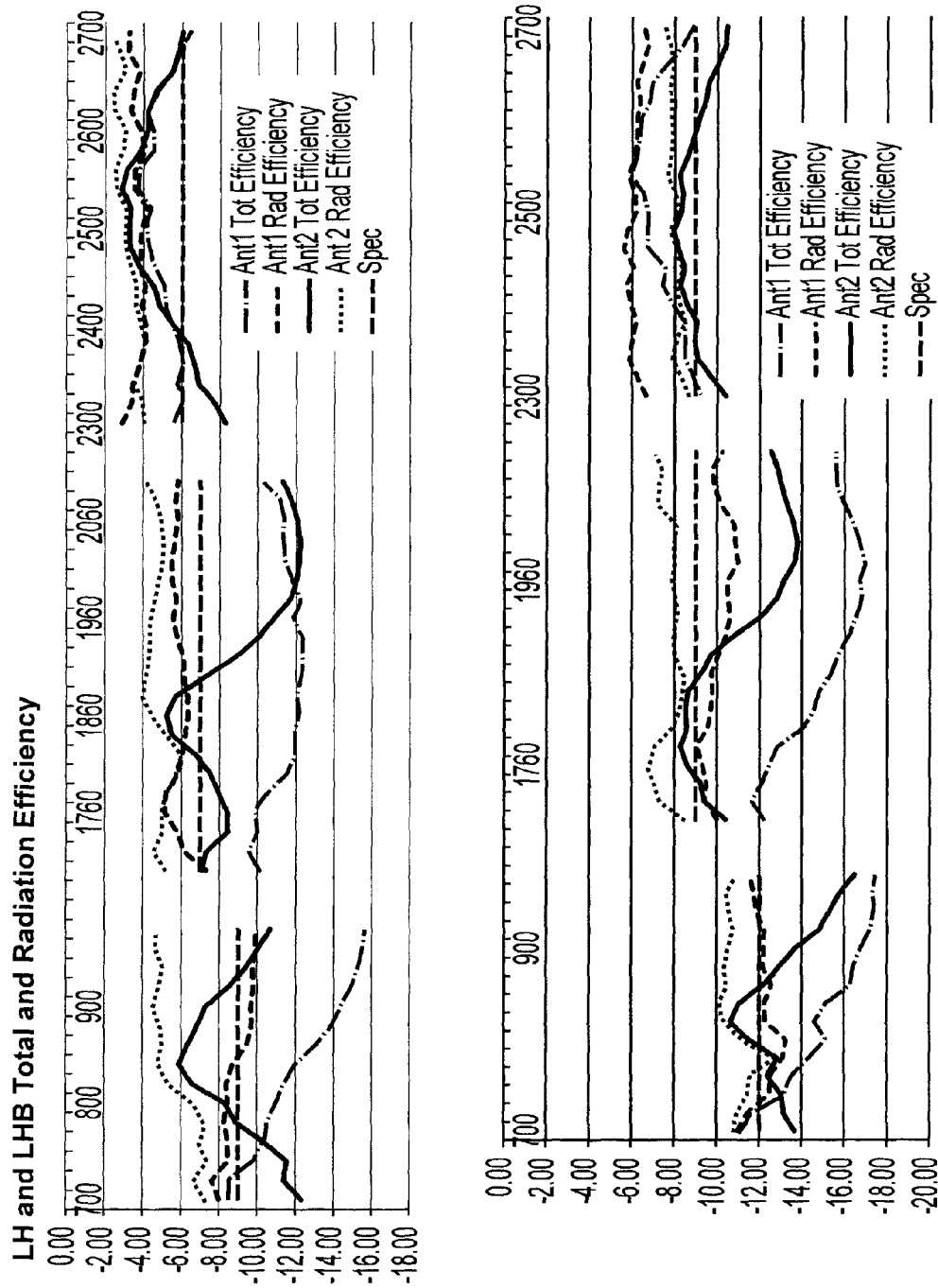
FIG. 13 depicts total and radiation efficiencies of the antennas of the successful prototype in specific use situations, according to non-limiting implementations.

Performance of the successful prototype is further depicted in FIG. 13, which shows left hand ("LH", top sets of curves) and left hand beside head ("LHB", bottom set of curves) total and radiation efficiency for antenna 111 ("Ant1" in FIG. 13) and antenna 112 ("Ant2" in FIG. 13), in each of the frequency ranges of 710-960 MHz, 1710-2100 MHz and 2300-2700 MHz, similar to FIG. 12, with a target specification value depicted in each frequency range as a straight line. The "left hand" curves show measured total and radiation efficiency when the successful prototype of device 101 is held in a left hand, away from a head, while the "left hand beside head" show measured total and radiation efficiency when the successful prototype of device 101 is held in a left hand, beside a head. In other words, the curves of FIG. 13 depicted measured total and radiation efficiency in "use" situations.

In any event, it is clear that for most frequencies, the radiated efficiencies are above the target specification.

Using such measurements, antenna selection table 146 can be populated. For example, attention is next directed to FIG. 14, which depicts a non-limiting implementation of an antenna selection table 146. However, while the depicted antenna selection table 146 is organized in a table format, and/or in rows and columns, in other implementations, antenna selection table 146 can be organized in any other format accessible to processor 120 to determine which antenna 111, 112 to select. Specifically, antenna selection table 146 depicts free space efficiency for each of antenna 111 ("Ant1") and antenna 112 ("Ant2") in various frequency ranges, as well as "Beside Head Hand Right" efficiencies, determined from measured curves similar to those of FIG. 13, but measured with the successful prototype in a right hand and beside a head.

In any event, antenna selection table 146 depicts, for each indicated frequency range, an average measured efficiency in the frequency range for each of antenna 111, 112, in decibels, switch and cable losses in each frequency range (about 1 decibel), and an antenna requirement in decibels in each frequency range, as well as which antenna to select in each frequency range and in each situation (i.e. either free space or "BHHR"). To determine which antenna to select, the losses are subtracted from each of the efficiency measurements for each of antenna 111, 112. When the total efficiency for a given antenna 111, 112 is greater than the requirement value, and/or within a given range of the requirement value (e.g. +/−about 0.5) the given antenna can be selected for use in that frequency range. When both antennas 111, 112 meet the requirement value, or alternatively both antennas 111, 112 fail the requirement value, then either of antennas 111, 112 can be selected. For example, in the frequency range of 710-790 MHz, the respective free space efficiencies of antennas 111, 112 are −2.0 and −4.5; subtracting the 1 decibel loss from these values results in respective values of −3.0 and −5.5. As −3.0 is above the requirement value of −5, antenna 111 can be selected for use in this frequency range, and as −5.5 is below the requirement value of −5, antenna 112 is not selected for use. In any event processor 120 can determine which frequency range is in use, further determine which use situation applies (e.g. left hand, right hand, beside head, free space etc. based on sensor readings and the like) and use switch 115 to select one or more of antennas 111, 112 for operation. Furthermore, such selection can be based on whether device is in an uplink mode (i.e. data being uploaded from device 101 to a network) or a downlink mode (i.e. data being downloaded to device 101 from the network). When in an uplink mode, only one of antennas 111, 112 is selected, while in a downlink mode, both of antennas 111, 112 can be selected.

It is further appreciated that SAR (specific absorption rate) can also be measured and used to populate antenna selection table. In other words, when SAR is above a given threshold for a given antenna 111, 112 in a given frequency range and/or a given use situation, the given antenna 111, 112 can be prevented from operating in order to minimize user exposure to radiation.

Furthermore, while antenna selection table 146 depicted in FIG. 14 shows the efficiency values for each of antennas 111, 112 in each frequency range, and losses for each, antenna selection table 146 can more simply comprise an indication of which of antennas 111, 112 to use in each frequency range without storing the efficiency values.

In any event, described herein are example devices with multi-band MIMO antennas that are located behind non-conducting portions of a partially metallic, and/or partially conducting, back cover.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is to be limited by the claims appended here.

What is claimed is:

1. A device comprising:
  a back side comprising:
    a conducting central portion;
    a first non-conducting portion comprising a first width from a first end edge of the back side to the conducting central portion;
    a second non-conducting portion opposite the first non-conducting portion, comprising a second width from a second end edge of the back side to the conducting central portion, the conducting central portion separating the first non-conducting portion and the second non-conducting portion; and
  a non-conducting chassis, the conducting central portion comprising a conducting sheet attached to an exterior of the non-conducting chassis, the first non-conducting portion and the second non-conducting portion each comprise opposite ends of the non-conducting chassis, and the first end edge and the second end edge comprises opposite end edges of the non-conducting chassis;

an interior chassis covered by the back side, the first and second antennas located on a first side of the interior chassis;

a first antenna located on the interior chassis behind the first non-conducting portion;

a second antenna located on the interior chassis behind the second non-conducting portion, each of the first antenna and the second antenna comprising at least two respective radiating arms configured to resonate in at least three frequency ranges;

an interior conducting plane located on a second side of the interior chassis opposite the first side of the interior chassis, each of the at least two respective radiating arms at least partially clearing the interior conducting plane;

one or more antenna feeds connected to each of the first antenna and the second antenna; and, a switch configured to select one or more of the first antenna and the second antenna for operation.

2. The device of claim 1, wherein the at least two respective arms of each of the first antenna and the second antenna clear the conducting central portion of the back side.

3. The device of claim 1, wherein each of the first antenna and the second antenna further comprise: a first respective connection to the one more antenna feeds; and a second respective connection to a ground plane.

4. The device of claim 1, wherein each of the first antenna and the second antenna further comprise: a first respective connection to the one more antenna feeds; and a second respective connection to a ground plane, each of the first respective connection and the second respective connection being on opposite sides of a respective antenna radiating structure.

5. The device of claim 1, wherein each of the first antenna and the second antenna further comprise: a respective connection to the one more antenna feeds, the respective connection clearing the conducting central portion of the back side.

6. The device of claim 1, wherein each of the first antenna and the second antenna further comprise: a respective connection to a ground plane, the respective connection at least partially located behind the conducting central portion of the back side.

7. The device of claim 1, wherein at least a respective portion of one or more of the first antenna and the second antenna at least partially wraps around a respective end of the interior chassis.

8. The device of claim 1, wherein a first radiating arm of the at least two respective radiating arms is located closer to the conducting central portion than a second radiating arm of the at least two respective radiating arms, the first radiating arm configured to resonate in a lower frequency range than the second radiating arm.

9. The device of claim 7, wherein the first radiating arm and the second radiating arm are generally parallel to each other, electrically connected by a connecting portion but otherwise separated by a gap, the first radiating arm electrically connected to a ground plane at a respective end and the second radiating arm electrically connected to the one or more antenna feeds.

10. The device of claim 1, wherein the first width and the second width are different from each other.

11. The device of claim 1, further comprising a port through an end of the device adjacent the first antenna, the first antenna clearing the port.

12. The device of claim 1, further comprising a memory storing an antenna selection table, and the switch is configured to select one or more of the first antenna and the second antenna for operation based upon the antenna selection table.

13. The device of claim 1, wherein the conducting central portion covers about 80% of the back side.

14. The device of claim 1, wherein:
a first one of the at least three frequency ranges comprises one or more of: a frequency range of about 710 MHz to about 960 MHz; an LTE (Long-Term Evolution) frequency range; and LTE700 frequency range;
a second one of the at least three frequency ranges comprises one or more of: about 1710 to about 2100 MHz, a GSM (Global System for Mobile Communications) frequency range; a CDMA (Code Division Multiple Access) frequency range; a PCS (Personal Communications Service) frequency range; and a UMTS (Universal Mobile Telecommunications System) frequency range; and,
a third one of the at least three frequency ranges comprises one or more of: about 2300 to about 2700 MHz, another GSM (Global System for Mobile Communications) frequency range; another CDMA (Code Division Multiple Access) frequency range; another PCS (Personal Communications Service) frequency range; and another UMTS (Universal Mobile Telecommunications System) frequency range.

15. The device of claim 11, wherein a portion of the interior conducting plane extends along the port.

* * * * *